United States Patent [19]

Katsube et al.

[11] 4,338,505
[45] Jul. 6, 1982

[54] METHOD AND APPARATUS FOR RESTORING A WIRE ELECTRODE

[75] Inventors: Hideo Katsube, Hachioji; Gotaro Gamo, Komae; Mitsuo Kinoshita, Hachioji; Yoshiyuki Nomura; Kanemasa Okuda, both of Hino, all of Japan

[73] Assignee: Fujitsu Fanuc Limited, Tokyo, Japan

[21] Appl. No.: 173,612

[22] Filed: Jul. 30, 1980

[30] Foreign Application Priority Data

Aug. 3, 1979 [JP] Japan ............................. 54-099347

[51] Int. Cl.³ ............................................. B23P 1/02
[52] U.S. Cl. ............................ 219/69 M; 219/69 W
[58] Field of Search ........................... 219/69 M, 69 W

[56] References Cited

U.S. PATENT DOCUMENTS

3,636,296  1/1972  Semin ................................. 219/69 W
3,891,819  6/1975  Ullmann et al. ................... 219/69 W
4,242,559 12/1980 Roemer et al. .................... 219/69 W Primary Examiner—C. C. Shaw
Attorney, Agent, or Firm—Staas & Halsey

[57] ABSTRACT

A method and apparatus for restoring a broken wire electrode in a wire electrode-type electric discharge machine for machining a workpiece into a desired shape while the workpiece is moved relative to the wire electrode on the basis of machining command data. For effecting the restoration of the wire electrode, memory means are provided for storing the relative machining starting position of the workpiece and the wire electrode at the machining starting point, and the relative wire electrode breakage position of the workpiece and the wire electrode when the wire electrode breaks. After the wire electrode breaks the relative position of the workpiece and the wire electrode is brought into coincidence with the machining starting position on the basis of information indicative of the machining starting position and the wire electrode breakage position. After the wire electrode is returned to a feed system therefor, the workpiece is again moved relative to the wire electrode from the machining starting point on the basis of the machine command data. The relative position of the workpiece and the wire electrode is made to coincide with the wire electrode breakage position, after which the discharge machining operation is resumed.

12 Claims, 10 Drawing Figures

METHOD AND APPARATUS FOR RESTORING A WIRE ELECTRODE

BACKGROUND OF THE INVENTION

This invention relates to a method of restoring a wire electrode employed in a wire electrode-type electric discharge machine, and to the apparatus for effecting such restoration, and more particularly to a method and apparatus for restoring a wire electrode which permits an electric discharge machining operation to be resumed automatically in a short period of time in the event of wire electrode breakage.

An electric discharge machine which uses a wire electrode as a cutter establishes a voltage differential between the electrode and a workpiece to induce an electric discharge or spark in the intervening space. The machine moves the workpiece relative to the wire electrode on the basis of data representative of machining instructions, thereby allowing the workpiece to be machined into a desired shape owing to the action of the electric discharge. There are occasions where the electrode breaks within the workpiece during the machining operation if such machining conditions as the applied voltage and feed speed are improper. In such an event, the operator must repair the broken electrode first by removing the broken portion from a take-up mechanism side, pulling the electrode upwardly through a lower guide from a supply mechanism, passing the end of the electrode through the slot which has been machined in the workpiece, and then fastening it to the take-up mechanism after passing it through an upper guide. Restoring the wire electrode in this manner so that machining can resume from the former position requires a considerable amount of time, particularly for threading the wire through the upper and lower guides, and results in diminished machining efficiency. Moreover, since the intervention of the operator is necessary to repair the broken wire electrode, the discharge machining operation will not be able to resume if the wire should break during unattended operation.

BRIEF SUMMARY OF THE INVENTION

Accordingly, it is an object of the present invention to provide a method and apparatus for restoring a wire electrode which permit machining to be resumed a short time after breakage of the wire electrode, and which enable restoration of the broken wire electrode without the intervention of human labor.

It is another object of the present invention to provide a method and apparatus for restoring a wire electrode which permit the end of a broken wire electrode on the electrode supply side to be positioned automatically below a slot or hole (the machining starting position) in the workpiece through which the wire electrode is to be re-inserted.

It is still another object of the present invention to provide a method and apparatus for restoring a wire electrode which permit a wire electrode, that has been restored to a running condition, to be brought automatically to the position at which it broke originally, following the path previously machined by the wire electrode prior to its breakage.

It is still another object of the present invention to provide a method and apparatus for repairing a wire electrode which permit a wire electrode, that has been restored to a running condition, to be positioned at the point where it broke originally with a positioning speed which is higher than that of the discharge machining speed.

It is a further object of the present invention to provide a method and apparatus for restoring a wire electrode which permit the discharge machining operation to be started in a reliable manner after the wire electrode has been positioned at the point where the wire electrode broke originally.

Other features and advantages of the invention will be apparent from the following description taken in conjunction with the accompanying drawings.

DETAILED DESCRIPTION OF THE PREFERRED EMBODIMENT

Figure 1:
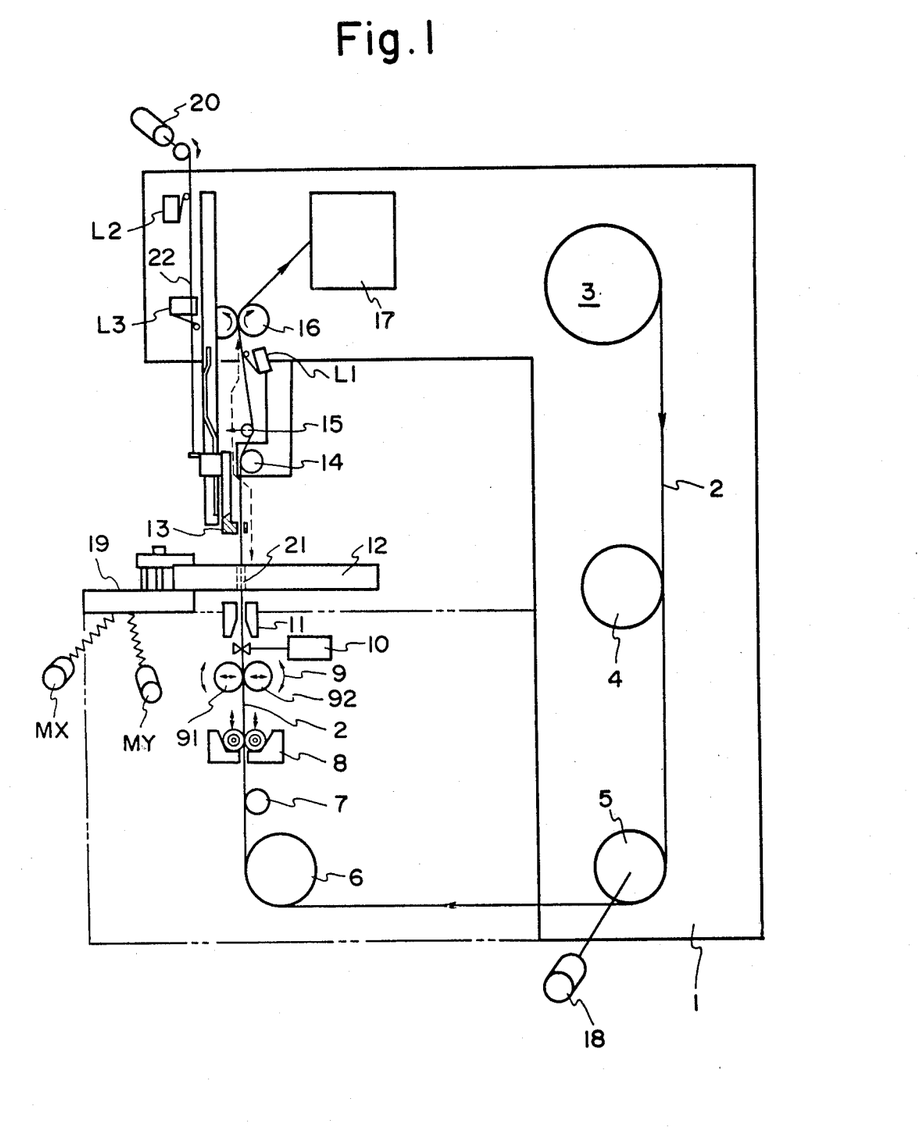
FIG. 1 is a front view showing the various mechanisms that constitute a wire electrode-type electric discharge machine to which the present invention can be applied.
Figure 2:
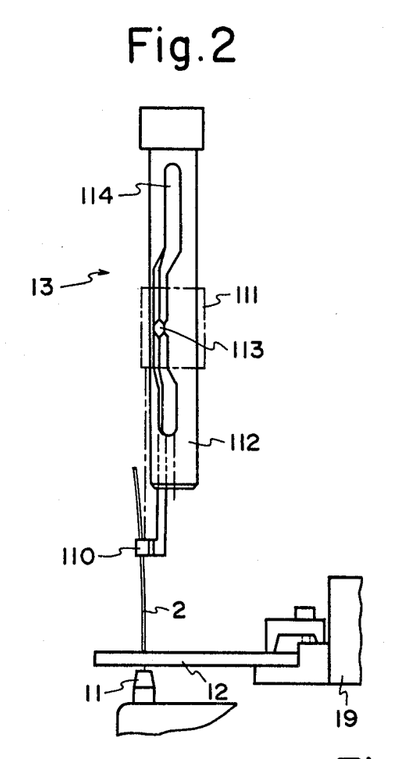
FIGS. 2 and 3 are simplified illustrative views of a wire electrode pull-up mechanism.

The general construction of an electric discharge machine is illustrated in FIG. 1 which shows the interrelationship among the principal operating mechanisms. The machine includes a column 1 for support, a wire electrode 2 for machining a workpiece 12, a wire electrode supply reel 3, a tension brake 4, guide rollers 5 and 6, a lower guide 7, a clamping mechanism 8, a wire electrode feed mechanism 9, a wire electrode position detecting mechanism 10, a nozzle 11, a wire electrode pull-up mechanism 13, an upper guide 14, a conduction pin 15 for supplying the wire electrode with electric power, a feed roller mechanism 16, a wire electrode take-up apparatus 17, a pulse coder 18 operatively coupled to the guide rollers for generating a pulse each time the guide roller rotates through a prescribed angle, work table mechanism 19 for carrying the workpiece, workpiece feed motors Mx, My for moving the worktable, and hence the workpiece 12, in X and Y directions, respectively, a motor 20 for driving the wire electrode pull-up mechanism 13, a limit switch $L_1$ employed in detecting breakage of the wire electrode 2, a limit switch $L_2$ which detects when lowering of the wire electrode pull-up mechanism 13 has been completed, and a limit switch $L_3$ which detects when elevation of the pull-up mechanism has been completed. Numeral 21 denotes a wire electrode insertion hole in the workpiece, and 22 a cord.

The wire electrode 2 is guided substantially vertically between the upper and lower guides 14, 7 and is fed upwardly by the feed rollers 16 to travel past the machining portion of the machine where the workpiece 12 is located. A prescribed high voltage is applied to the wire electrode 2 through the conduction pin 15 to establish a high-voltage differential across the wire electrode and the workpiece 12, and the latter is moved in a horizontal plane by the feed motors Mx, My in a predetermined manner so as to be machined along a desired path by the wire electrode.

In the above apparatus there are occasions where the wire electrode breaks off within the workpiece during the machining operation if such machining conditions as the applied voltage and the workpiece feed speed are improper. Such breakage of the wire electrode 2 is detected by the limit switch $L_1$ which is caused to open owing to the resulting loss in tension in that portion of the wire on the take-up side. When breakage is detected, relative movement between the workpiece 12 and the wire electrode 2 is brought to a halt immediately together with a cut off in the supply of power to the wire electrode 2, and the supply of both the wire electrode and a machining liquid are terminated. The portion of the wire electrode remaining on the take-up side is then fed upwardly from the break-off point and is guided to the wire electrode take-up mechanism 17 where it is wound up. Meanwhile, the portion of the wire electrode below the break-off point, namely that portion of the electrode on the supply side, is clamped by the clamping mechanism 8 at almost the same time as the breakage accident, and is then delivered to the wire electrode feed mechanism 9 which pulls the end of the broken wire back to a prescribed position. Thus the clamping action of the clamping mechanism 8 on the wire electrode supply side prevents the broken portion of the wire on that side from falling under its own weight or from coiling around any of the nearby parts. This allows the wire electrode 2 to be re-introduced into the wire electrode insertion hole, namely a machining starting hole 21 which has an enlarged diameter and which is located at a machining starting point that will be described in greater detail later, and also allows the wire electrode to be introduced into the upper guide 14 and feed rollers 16. The arrangement thus permits the wire electrode to be restored to the running condition fully automatically.

The wire electrode on the supply side of the machine is pulled back under the control of the wire electrode feed mechanism 9 and the wire electrode position detecting mechanism 10. Specifically, the wire electrode feed mechanism 9 is actuated to retract the wire electrode from the work piece and send it back in the direction of the supply reel 3. The operation of the feed mechanism 9 is terminated, however, by the detecting mechanism 10 when the detecting mechanism is no longer able to detect contact with the wire electrode, that is, when the end of the broken wire electrode passes by a detection point so that electrical contact with the detector is interrupted. The feed mechanism thus stops the end of the wire electrode at a predetermined position. The wire electrode feed mechanism 9 includes a pair of drive rollers 91, 92 and a roller drive motor which is not shown. The drive rollers are spaced apart from each other at rest positions during the course of a machining operation, but are brought into contact with each other at operating positions when pulling back the wire electrode portion on the supply side, as described above, and when sending the wire electrode back to the machining starting hole 21 located at the machining starting position which will be described later. Thus, when the drive rollers 91, 92 are in the operating positions they clamp the wire electrode 2 and are driven in a predetermined direction to either pull the electrode back toward the supply side or feed it toward the workpiece.

Thus, upon breakage of the wire electrode, that portion of the wire electrode on the take-up side is wound up by the take-up mechanism, and that portion on the supply side is clamped and manipulated in such a manner that the end thereof is positioned as prescribed. When this series of operations has been completed, a numerical control device, to be described later, drives the motors Mx, My so as to move the workpiece 12 relative to the wire electrode 2 and thereby restore the workpiece to the machining starting point. The numerical control device then restores the wire electrode to its running condition. The machining starting point is either outside the workpiece or coincides with a machining starting hole 21 of enlarged diameter.

Figure 3:
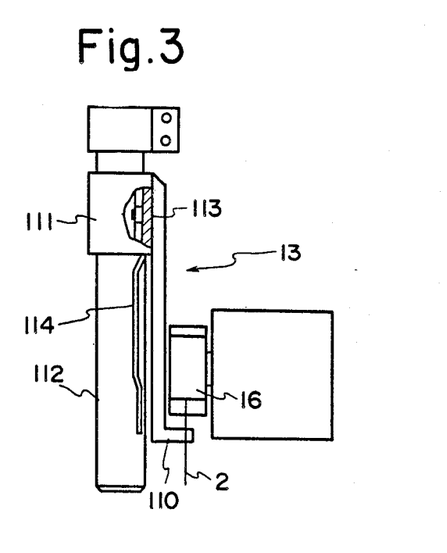
Figures 4, 5:
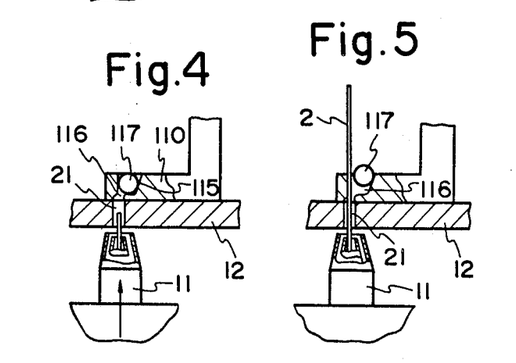
FIGS. 4 through 6 are illustrative views useful in describing the operation of the wire electrode pull-up mechanism.
Figure 6:
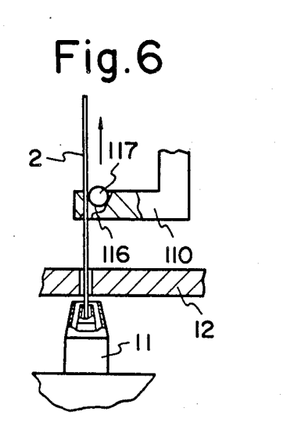

How the wire electrode 2 is restored to its running condition is shown in FIGS. 2 through 6, FIGS. 2 and 3 illustrating the wire electrode pull-up mechanism, and FIGS. 4 through 6 showing the procedure through which the wire electrode is inserted into the machining starting hole 21 and then pulled up from the workpiece. The wire pull-up mechanism 13 includes a wire electrode gripping portion 110, a sliding portion 111 interconnected therewith, and a shaft portion 112. The sliding portion 111 is capable of sliding vertically along the shaft portion 112 and has a pin 113 which is engaged with a cam slot 114 formed in the shaft portion 112, whereby the sliding portion 111 in moving vertically along the shaft portion is constrained to turn in a particular manner which is decided by the shape of the cam slot 114. The sliding portion 111 is turned as described above in order that the pull-up mechanism 13 will not interfere with the upper guide 14 at the stage where the wire electrode 2 is set between the feed rollers 16 shown in FIG. 1. The gripping portion 110 includes a hole 116 having a tapered wall portion 115, shown in greater detail in FIG. 4, the hole receiving a knurled roller 117.

In operation, the gripping portion 110 is lowered via a cord 22 by actuating the motor 20, the cord and motor being shown in FIG. 1. The cord 22 slackens when the gripping portion 110 comes to rest upon the upper surface of the workpiece 12, and the limit switch $L_2$ in FIG. 1 opens upon sensing the slack in the cord, thereby deactivating the motor 20. The result is illustrated in FIG. 4, in which the gripping portion 110 is shown flush against the upper surface of the workpiece 12, with the hole 116 in alignment with the machining starting hole 21 in the workpiece. When the wire electrode feed mechanism 9 described above feeds the wire electrode 2 upwardly by a prescribed amount, the end of the wire electrode passes through the hole 21 in the workpiece 12, pushes up the roller 117 up and passes through the hole 116 in the gripping portion 110, the end of the electrode finally emerging in the space above the gripping portion 110, as depicted in FIG. 5. Running the motor 20 in the reverse direction to elevate the gripping portion 110 via the cord 22 now causes the roller 117 to wedge the wire electrode 2 against the wall portion of the hole 116, as shown in FIG. 6, so that the wire electrode is pulled upwardly along with the gripping portion 110. When the latter has reached its maximum elevation the limit switch $L_3$ in FIG. 1 is closed to halt the motor 20. At this time the upper end of the wire electrode 2 has been pulled up to a position high enough to permit it to be engaged by the feed rollers 16, the latter then being driven to feed the wire electrode grasped therebetween. This completes the automatic restoration of the electrode wire, which fact is detected by the limit switch $L_1$ that closes as a result, thereby terminating the signal indicative of wire electrode breakage. In the operation described above the amount of wire electrode feed is adjusted in accordance with workpiece thickness in such a manner that a prescribed amount of the electrode will protrude from the upper surface of any workpiece that is mounted on the worktable mechanism 19. For example, the pulse coder 18 shown in FIG. 1 can be made to generate a number of pulses equivalent to a certain amount of wire electrode feed if a manually operated data input device MD1, of a numerical control unit to be described later, is employed to enter the value of the desired amount of feed in accordance with the thickness of the workpiece. With such an arrangement the operation of the wire electrode feed mechanism 9 would stop after the generation of the last pulse, leaving the desired length of the wire electrode 2 projecting from the upper surface of the workpiece 12.

The numerical control unit mentioned above, but which is not shown in the drawings, resumes the positioning of the workpiece when the restoration of the wire electrode 2 has been completed as described. More specifically, the numerical control unit, in response to machining command data, again moves the workpiece 12 relative to the wire electrode 2 starting from the machining starting point and continues to move the workpiece until that portion of the workpiece at which the wire electrode broke is re-positioned at the restored wire electrode. In positioning the workpiece in this fashion a considerable amount of time is required to feed the workpiece at the speed instructed by the machining command data. It is preferred, therefore, that the workpiece be fed at a separately established speed by means of a known dry-run control method. Such an expedient would permit the position of the wire electrode 2 relative to the workpiece 12 to be rapidly restored to that point on the workpiece at which the wire electrode broke, this being accomplished while following the path previously machined by the electrode prior to its breakage. After the positioning operation has been completed the numerical control unit confirms whether or not the electric discharge machine is ready to resume machining. In other words, the numerical control unit confirms whether the wire electrode 2 is running under proper tension, whether the machining liquid is being delivered, whether power is being applied to the wire electrode, and whether a number of other conditions have been met. If all of these requirements for resuming machining have been satisfied, the numerical control unit issues a machining start command, causing the electric discharge machining operation to resume from the former machining position while the workpiece 12 is moved relative to the wire electrode 2, all of this taking place on the basis of the machining command data.

Figure 7:
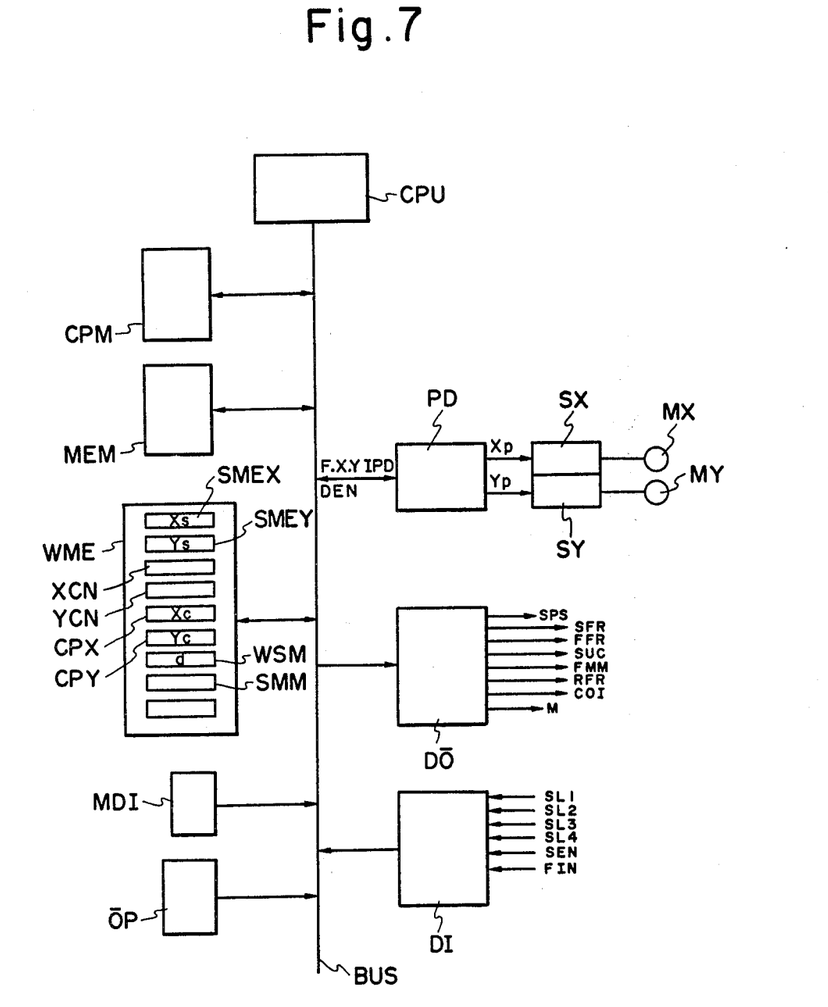
FIG. 7 is a block diagram of an apparatus for repairing a broken wire electrode according to the present invention.
Figure 8:
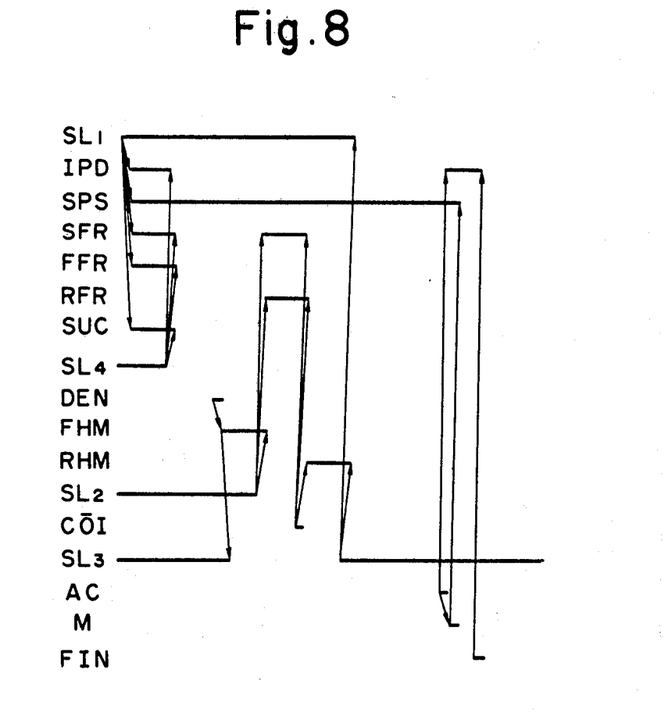
FIG. 8 is a timing chart useful in describing the operation of the wire electrode restoration apparatus.

Illustrated in FIG. 7 is a block diagram showing an electrical system of a numerical control device as used in a wire electrode-type electric discharge machine for practicing the present invention. The associated timing chart of system operation is shown in FIG. 8.

The numerical control unit relies upon an electronic computer and is of the type well-known in the art, and includes a central processing unit CPU, a memory MEM for storing a machining program composed of a large quantity of data, a working memory WME comprising a high-speed random access memory for storing such information as the machining starting position, the wire breakage or cutting position, and the results of operations performed by the processor CPU, a control program memory CPM for storing the control program, a manually operated data input device MDI for entering such data as the amount of wire electrode feed when the wire electrode is being restored to its running state, an operational panel OP, a pulse distributor PD which executes a pulse distribution operation on the basis of position command data to produce and distribute pulses, a digital data output device DO for supplying the machine side with command signals from the numerical control unit, a digital data input device DI for transmitting signals from the machine side to the processor CPU, and servo circuits SX, SY for driving the motors MX, MY that move the workpiece in the X and Y directions. The exchange of data between the processor CPU and the other units takes place over a bus line BUS which includes a data bus for the transfer of data and an address bus for the transfer of addresses.

Figure 9:
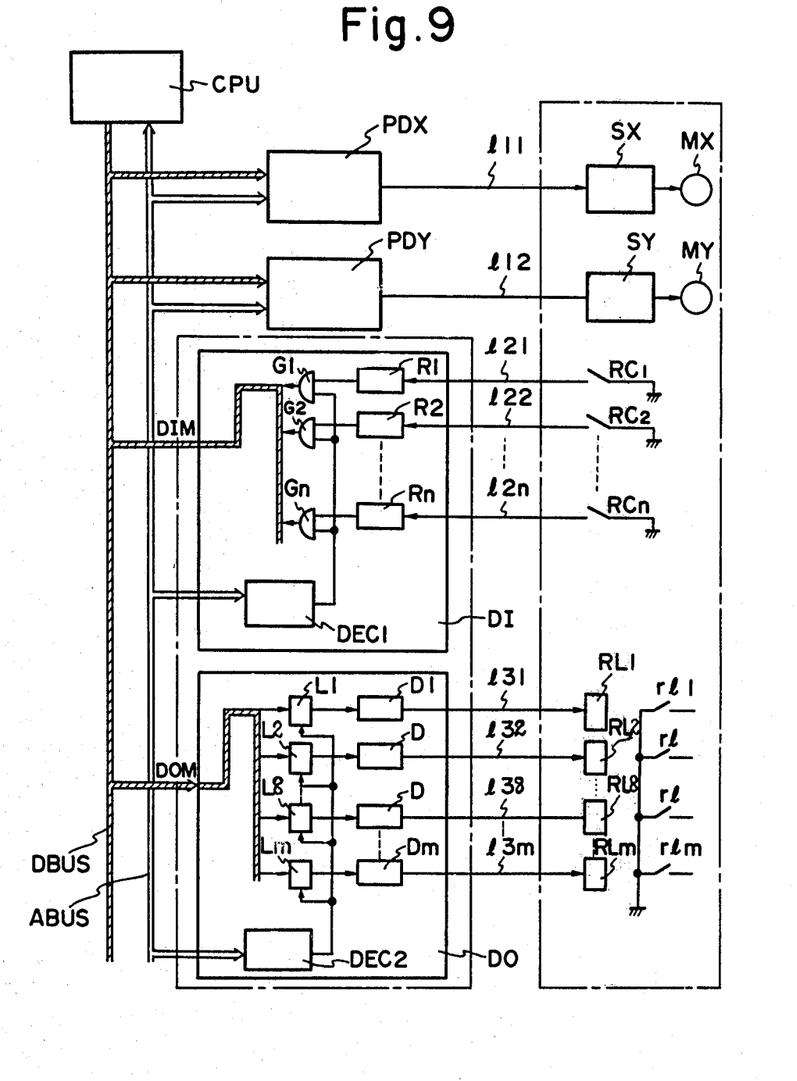
FIG. 9 is a block diagram of a digital data output device and a digital data input device.

The exchange of data between the wire electrode-type electric discharge machine and the numerical control unit is illustrated in FIG. 9. It should be noted, however, that such components as the working memory WME and control program memory CPM have been deleted from the Figure.

A digital data input circuit DI includes receivers $R_1$ through $R_n$ which receive various signals from limit switches, relay contacts and sensors that are located on the machine side, AND gates $G_1$ through $G_n$, and a decoder $DEC_1$ which decodes address signals and opens the AND gates $G_1$ through $G_n$. A digital data output circuit DO includes a number of latch circuits $L_1$ through $L_m$ for storing a binary coded decimal (BCD) two-digit S function command, a BCD two-digit T function command and other signals such as control signals, which will be described later, that are sent to the machine side when a broken wire electrode is processed, drivers $D_1$ through $D_m$ for corresponding ones of the latch circuits $L_1$ through $L_m$, the drivers being adapted to send the latch circuit output signals to the machine tool side, and a decoder $DEC_2$ which allows prescribed latch circuits to be set or reset upon decoding the address signals. PDX and PDY are pulse distributors for the X- and Y-axes, respectively.

Cables $l_{11}$ through $l_{12}$, $l_{21}$ through $l_{2n}$, and $l_{31}$ through $l_{3m}$ provide connections between the numerical control unit and the discharge machine DMAC to enable the exchange of data. Relay contacts $RC_1$ through $RC_n$ open and close in accordance with the open/close operation of the limit switches, sensors and so forth mounted on the machine. Among the limit switches are included the limit switch $L_1$ (FIG. 1) for detecting breakage of the wire electrode, the limit switch $L_2$ for detecting when lowering of the wire electrode pull-up mechanism has been completed, the limit switch $L_3$ for detecting when elevation of the pull-up mechanism has been completed, a limit switch built in the position detector 10, and switches which are not shown, such as overtravel limit switches for the $\pm X$ and $\pm Y$ directions, and speed reduction limit switches for the $\pm X$ and $\pm Y$ directions. The contact signals from these relay contacts $RC_1$ through $RC_n$ are sent to receivers $R_1$ through $R_n$ over cables $l_{21}$ through $l_{2n}$. Relays $RL_1$ through $RL_m$ operate in accordance with the outputs of drivers $D_1$ through $D_m$ and open or close relay contacts $rl_1$ through $rl_m$ to control the supply of machining liquid to the discharge machine, the feed of the wire electrode, the supply of electric current to the wire electrode, the action of the clamping mechanism (FIG. 1) and so on.

The description will now turn to the output of digital data from the numerical control unit to the electric discharge machine DMAC and the input of digital data to the numerical control unit from the electric discharge machine. The description will begin with the readout of relay contact signals $RC_1$ through $RC_n$ from the electric discharge machine DMAC.

The processor CPU, utilizing bus idle time, sends out on the address bus ABUS, in order, the addresses $AD_1$, $AD_2 \ldots AD_n$ of the contact signals $RC_1$, $RD_2 \ldots RC_n$. These addresses are decoded by the decoder $DEC_1$. Accordingly, if the address $AD_1$ appears on the address bus ABUS, the decoder $DEC_1$ responds by opening only the AND gate $G_1$, so that the contact signal $RC_1$ enters the data bus DBUS through the cable $l_{21}$, receiver $R_1$, and AND gate $G_1$ and is accepted by the processor CPU. This process continues in identical fashion until $RC_n$ enters. If the entry of $RC_n$ has been completed, the operation is such that the addresses $AD_1$, $AD_2 \ldots AD_n$ are generated again, and the contact signals $RC_1$, $RC_2 \ldots RC_n$ entered again. Therefore, by way of example, let $RC_1$ be the relay contact which corresponds to the limit switch $L_1$ for detecting breakage of the wire electrode. This means that the processor CPU will be informed of the status (open or closed state) of the limit switch $L_1$ when the address signal $AD_1$ is generated. In the event of an emergency situation such as breakage of the wire electrode, it is necessary that the processor CPU detect this immediately. If such an event occurs the address of the contact signal resulting from the emergency will appear on the address bus ABUS and will have a shorter period than the other addresses. The appearance of this signal will permit the processor to take the necessary action. It is also possible to provide an interrupt signal generating circuit which could be adapted to issue an interrupt signal upon breakage of the wire electrode so as to inform the processor of the accident. Though the contact signals enter one at a time in accordance with the foregoing operation, it is obvious that a plurality of these signals can be entered at one time by arranging it so that a plurality of AND gates (of a number corresponding to one byte, for example) open for a single address.

The delivery of digital data outputs to the electric discharge machine DMAC proceeds as follows.

If the command data read out from the data memory MEM in FIG. 7 is a miscellaneous function command "M03", for example, the processor CPU sends an address signal AD(m), which conforms to the M function command, out on the address bus ABUS, and sends data "03" (0000 0011) out on the data bus DBUS. The address signal AD(m), after being decoded by the decoder $DEC_2$, places only eighth latches $L_1$ through $L_8$ in a state that allows them to be set or reset, these latches being those which are to store the BCD two-digit (eighth bit) M function command. Accordingly, the data "03" (0000 0011) of one byte on the data bus DBUS is stored in the latches $L_1$ through $L_8$ ($L_1$, $L_2$ are set and $L_3$ through $L_8$ reset), and is delivered to the electric discharge machine DMAC through the cables $l_{31}$ through $l_{38}$ to open or close the relays $RL_1$ through $RL_8$. As a result, decoding of the relay contacts $rl_1$ through $rl_8$ takes place on the discharge machine side, and a machine operation is executed in accordance with the miscellaneous command "M03". For example, the command may cause a machining liquid to flow for machining. If this occurs a relay contact $RC_i$ for completion of the M function closes to produce a contact signal which is taken in by the processor in the manner described above, allowing the discharge machine to be controlled in accordance with the next command.

Wire electrode repair signals SPS, SFR, . . . COI, which will be described hereinafter, are generated when the wire electrode breaks, and these signals are sent to the discharge machine DMAC in the same manner as described above. For example, if $L_9$ through $L_{16}$ are taken as latch circuits for storing control signals SPS, SFR, . . . COI, which serve as wire electrode restoration signals, then at the time of wire electrode breakage an address AD(c) corresponding to a wire electrode repair command will be issued on address bus ABUS and a signal, such as a roller drive motor forward rotation signal FFR (0001 0001) of one byte will be issued on data bus DBUS. The address signal AD(c) will be decoded by decoder $DEC_2$ and then place only the latches $L_9$ through $L_{16}$, which are to store the wire electrode repair command, in a state that will enable these latches to be set or reset. Accordingly, the one byte data (0001 0001) on data bus DBUS will be stored in latches $L_9$ through $L_{16}$ (latches $L_9$, $L_{13}$ will be set, and latches $L_{10}$ through $L_{12}$, and $L_{14}$ through $L_{16}$ will be reset) and sent out to the discharge machine DMAC over cables $l_{39} \ldots$, the machine responding to the signal FFR to rotate, in the forward direction, the roller drive motor (not shown) of the wire electrode feed mechanism 9, illustrated in FIG. 1.

Figure 10:
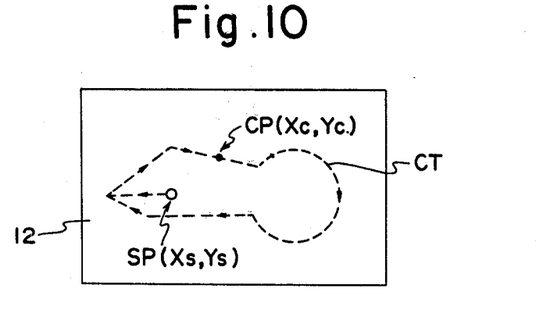
FIG. 10 is an illustrative view which shows a machining path, a machining start point, and a wire electrode breakage position.

Reference will now be had to FIG. 10 which shows the workpiece 12 when it is being machined into the configuration CT as indicated by the dashed line. It will be assumed that the wire electrode breaks off at the point CP during machining. SP represents the machining starting point for the line CT along which the workpiece 12 is to be machined. The wire electrode repair operation will now be described in connection with the drawing of FIG. 10.

The head of a machining program is provided with a G function command (G92) in order to establish the coordinates $(X_s, Y_s)$ of the machining starting point SP for the pattern CT. The X and Y values that follow the G92 instruction, i.e., G92X . . . , Y . . . , indicate the coordinates $(X_s, Y_s)$ of the machining starting point.

When the cycle start button on the operation panel is depressed, the processr CPU responds to the control program to read out from the memory MEM the initial machining command data G92 $X_{00} \ldots 0$, $Y_{00} \ldots 0$ of the machining program, and to store the machining starting point coordinates $(X_s, Y_s)$ in the machining starting point storage regions SMEX, SMEY of the working memory WME. From then onward data is read out in order and, if it is data related to relative movement between the workpiece and the wire electrode, namely data related to feed speed F and degrees of movement X, Y, the data F, X, Y is applied to pulse distributors PDX, PDY shown in FIG. 9. The pulse distributors execute a pulse distribution operation on the basis of this data and supply pulses $X_p$, $X_p$ to the servo circuits SX, SY. The data contained in the present position storage regions XCN, YCN of the working memory WME is incremented or decremented in accordance with the direction of workpiece movement each time a pulse $X_p$, $Y_p$ is generated. The servo circuits SX, SY upon receiving the pulses $X_p$, $Y_p$ drive the motors MX, MY through a known method of servo control and cause the workpiece 12 to be moved relative to the wire electrode 2 at the command feed speed. Let it now be assumed that the wire electrode, for some unknown reason, breaks off in the workpiece 12 at the point CP in FIG. 10 during the course of machining. The resulting loss in wire electrode tension is detected by limit switch $L_1$ which opens and generates a signal $SL_1$ indicative of wire breakage, the duration of this signal being shown in FIG. 8. The signal enters the digital data input device DI and interrupts the processor CPU so that the control program executes a shift to an interrupt routine. In consequence, an interrupt process is executed at the time of wire electrode breakage. It should be recalled that the portion of the wire electrode on the supply side is mechanically clamped by the clamping mechanism 8 of FIG. 1 at almost the same time that the wire electrode breaks.

When the processor is interrupted as described above, a broken wire process is initiated under the control program. Thus, the processor CPU, under the control of the control program, causes a distribution inhibit signal IPD (FIG. 8) to be delivered to the pulse distributor PD to terminate the pulse distribution operation. The processor also takes the wire breakage position ($X_c$, $Y_c$) which is stored in the present position storage regions XCN, YCN and transfers to the wire breakage position storage regions CPX, CPY in the working memory WME, shown in FIG. 7, where the data is stored. The processor also causes the digital data output device DO to issue a signal SPS which terminates the supply of electric power, the operation of the wire feed system, and the supply of machining liquid. These termination operations can be effected on the machine side when the limit switch $L_1$ opens.

The processor CPU next causes the digital data output device DO to issue the signals SFR, FFR. The signal SFR causes the pair of drive rollers 91, 92 of the wire electrode feed mechanism 9 to move to their operating positions where they grasp the portion of the wire electrode on the supply side, and the signal FFR causes the drive motor for the rollers 91, 92 to rotate in the forward direction so that the wire electrode 2 grasped between the rollers will be pulled and fed back toward the side of the reel 3. The digital data output device DO delivers also an unclamp signal SUC to the clamping mechanism 8 when the wire electrode is pulled back as described above, the signal causing the clamping mechanism to release the wire electrode so that there is no resistance applied to it as it is retracted.

The wire electrode 2 on the supply side continues to be pulled back or retracted in the above manner until the end of the wire passes a detection point on the position detector 10. When this occurs the detection signal $SL_4$ from the detector 10 goes to logical "0" and is read by the processor CPU through the digital data input device DI. The processor responds through the digital data output device DO to remove the signals SFR, FFR, SUC, whereby the drive rollers of the wire electrode feed mechanism 9 are returned to their rest positions, leaving the end of the wire electrode positioned at the detection point of the position detector 10. The wire electrode is temporarily held at this position by the clamping mechanism 8 which has been reactuated by the removal of the signal SUC.

When the processor CPU has completed the above-said retraction of the wire electrode, the distribution inhibit signal IPD is removed and the coordinates ($X_s$, $Y_s$) of the machining starting position and the coordinates ($X_c$, $Y_c$) of the cutting position coordinates ($X_c$, $Y_c$) are read out from the machining starting point storage regions SMEX, SMEY and the wire breakage storage regions CPX, CPY, respectively, of the working memory WME. The processor then performs the operations $X \leftarrow X_c - X_s$, and $Y \leftarrow Y_c - Y_s$ to obtain the distance, in the X and Y directions, between the wire electrode breakage position and the machining starting point. X and Y, which are the results of the operation, are applied as inputs to the pulse distributor PD which responds by executing a pulse distribution operation on the basis of these inputs. As a result, the workpiece 12 is returned to the machining starting point SP by the pulses $X_p$, $Y_p$ at a high speed or under dry-run control. When the distribution operation has been completed, that is, after the workpiece 12 has reached the machining starting point, the pulse distributor PD sends a distribution completion signal DEN to the processor CPU. At this time the contents of the present position storage regions XCN, YCN are $X_s$ and $Y_s$, respectively.

The processor CPU responds to the distribution completion signal DEN to begin the restoration and tensioning of the wire electrode 2. It does this first by issuing a signal FHM from the digital data output device DO to start the motor 20, shown in FIG. 1, the motor responding by lowering the gripping portion 110 of the wire electrode pull-up mechanism 13. When the gripping portion abuts against the upper surface of the workpiece 12, the cord 22 shown in FIG. 1 slackens, and the limit switch $L_2$ for detecting completion of the lowering operation opens upon sensing the slack in the cord. When this occurs the limit switch signal $SL_2$ goes to logical "0". This signal is read by the processor CPU through the digital data input device DI which responds by removing the signal FHM, thereby to halt the descent of the gripping portion 110. At the same time, the processor responds to the signal $SL_2$ at the "0" logic to produce the signals SFR, RFR which cause the drive rollers of the wire electrode feed mechanism 9 to assume their operating positions and which cause the roller drive motor to rotate in the reverse direction. As a result, the portion of the wire electrode on the supply side is passed through the machining starting hole 21 in the workpiece 12 and is fed into the hole 116 in the gripping portion 110, as illustrated in FIGS. 4 and 5. It should be noted that the amound d of wire electrode feed has been determined in accordance with the thickness of the workpiece and has been entered by the manually operated input device MDI and stored in the command feed storage region WSM of the working memory WME. As the wire electrode 2 is delivered in the above manner the guide roller 5 is rotated by the wire as it moves. The pulse coder 18 which is coupled to the guide roller 5 is adapted to generate a pulse each time the guide roller rotates by a specified amount. When the resulting pulse SEN enters through the digital data input device DI, the content (initially all "0"s) of the feed storage region SMM of the working memory WME is incremented by $+1$, and the incremented content is then compared with the command feed d stored in the command feed storage region WSM. The digital data output device DO issues a signal COI when the command feed storage region WSM and the feed storage region SMM agree in content. The generation of the coincidence signal COI causes the signals SFR, RFR to be removed, thereby bridging an end to the wire electrode feeding operation, and results in the issuance of a signal RHM which causes the motor 20 to rotate in the reverse direction thereby to begin raising the gripping portion 110 of the pull-up mechanism. When the gripping portion has reached its maximum elevation the limit switch $L_3$ is closed, resulting in the generation of a signal $SL_3$ which causes the processor CPU to remove the signal RHM. As a result, the motor 20 stops rotating to halt the ascent of the gripping portion 110. The end of the wire electrode 2 at this time is engaged by the feed rollers 16, as shown in FIG. 3, thereby completing the restoration and tensioning of the wire electrode. This operation results in the removal of the wire electrode breakage signal $SL_1$ since the limit switch $L_1$ is now closed by the restored electrode. The processor CPU, upon sensing this new condition, takes G92 as a key word and retrieves the address of the location, which stores the leading machining data, from the memory MEM that stores the machining program. The processor then reads out the machining data from this address sequentially, and executes a process which is identical to that of the initial machining operation. If the relative speed of movement between the workpiece 12 and the wire electrode 2 from the machining starting point SP to the wire breakage position CP is made equivalent to the speed (the command speed) which was in effect at the time of the discharge machining operation, then a considerable amount of time will be required for the wire breakage position CP to be reached. For this reason the arrangement is such that the dry-run instruction can be entered using the operation panel OP to set the workpiece feed speed to any desired value.

Thus, the processor CPU is constantly comparing the present position, which is stored in the present position storage regions XCN, YCN, with the wire electrode breakage position $(X_c, Y_c)$ which is stored in the wire electrode breakage storage regions CPX, CPY, and causes the workpiece 12 to be moved on the basis of the machining data read out from the memory MEM, until coincidence between the present position and breakage position is attained. When such coincidence is attained (i.e., when the coincidence signal AC goes to logical "1"), the distribution inhibit signal IPD is sent to the pulse distributor PD which responds by halting the production of pulses. As a result, relative movement between the workpiece 12 and the wire electrode 2 stops. Moreover, the processor CPU, in response to the signal AC at logical "1", supplies the machine side with a prescribed miscellaneous function command M through the digital data output device DO, thereby to supply the machining liquid, to feed the wire electrode, and to apply voltage to the conduction pin 15. When a signal FIN indicating completion of the machining preparation is obtained from the machine side, the processor removes the distribution inhibit signal IPD and allows the discharge machining operation to resume while moving the workpiece 12 at the command speed.

While the present invention has been described and illustrated in connection with a preferred embodiment in which the workpiece 12 is moved while the position of the wire electrode 2 is held stationary, an arrangement is possible in which the wire electrode 2 is moved relative to the workpiece. Furthermore, though the pulses $X_p, Y_p$ are up-counted or down-counted in the above description each time they are generated, thereby to give an indication of the present cutting position, it is possible to devise an arrangement in which the indication of the present position is obtained by counting feedback pulses generated whenever the motors MX, MY rotate by prescribed amounts or whenever the workpiece is moved by a prescribed amount.

It should also be noted that the present invention is not limited to the foregoing arrangement in which the $G92\ X_{00...0}, Y_{00...0}$ instruction is provided at the head of the machining program, with G92 being designated the key word in retrieving the leading address of the machining program, and with the workpiece being moved to the wire electrode breakage position, after the repair of the wire, on the basis of the machining data read out from the leading address. In other words, it is possible to take the sequence number of the initial machining data as the key word in retrieving the leading address.

It is also not required to adopt the above arrangement in which the machining program is stored beforehand in the memory and then read out from the memory in succession in order to perform machining. Instead, the machining program can be punched in a tape and a tape reader employed to read out the machining program from the tape. In such an arrangement, however, it would be necessary for the tape reader to be capable of reading backward, and it would be necessary to perform the search by reading G92 or the sequence number backward, in order to enable the workpiece to be moved after the repair of the wire electrode.

In still another modification the coordinates of the machining starting point can be set manually by the manually operated input device MDI rather than by the G92 instruction.

In a program which provides for two or more machining starting holes, the leading address can be retrieved with facility if the coordinates are set, as by the G92 instruction, at the head of machining data which commands machining from each of the machining starting holes.

It can thus be understood that the present invention permits discharge machining to be resumed a short time after the breakage of the wire electrode without the intervention of human labor, and precludes a suspension of the machining operation even if the wire electrode should break when the equipment is unattended. The invention therefore greatly enhances machining efficiency.

As many apparently widely different embodiments of the present invention may be made without departing from the spirit and scope thereof, it is to be understood that the invention is not limited to the specific embodiments thereof except as defined in the appended claims.

What we claim is:

1. A method of restoring a broken wire electrode in a wire electrode-type electric discharge machine for machining a workpiece into a desired shape by a wire electrode while the workpiece is moved relative to the wire electrode on the basis of machining command data, said method comprising the steps of:
storing the relative machining starting position of the workpiece and the wire electrode at the machining starting point;
machining the workpiece by creating an electrical discharge between the workpiece and the wire electrode while moving the workpiece relative to the wire electrode in accordance with the machining command data;
monitoring the relative current position of the workpiece and the wire electrode;
generating a wire breakage signal when the breakage of the wire electrode is detected;

stopping the machining when the wire electrode breaks;

storing the relative current position as a relative wire electrode breakage position of the workpiece and the wire electrode when the wire breakage signal is generated;

bringing the relative position of the workpiece and the wire electrode into coincidence with said machining starting position by moving the workpiece relative to the wire electrode on the basis of information indicative of said machining starting position and said electrode wire breakage position after the wire electrode has broken;

restoring the wire electrode, at the machining starting position, to the path along which the wire electrode travels;

moving the workpiece again relative to the wire electrode from the machining starting point to the wire electrode breakage position on the basis of the machining command data;

stopping the movement of the workpiece relative to the wire electrode when the current position coincides with the wire electrode breakage position; and starting electric discharge machining again after the relative position of the workpiece and the wire electrode has been brought into coincidence with said wire electrode breakage position.

2. A method of restoring a broken wire electrode according to claim 1, wherein said step of bringing the relative position of the workpiece and the wire electrode into coincidence with said machining starting position comprises the steps of:

computing the difference between the relative machining starting position and the relative wire electrode breakage position;

performing a pulse distribution operation in accordance with the difference; and moving the workpiece relative to the wire electrode along a substantially straight line which connects the machining starting position to the wire electrode breakage position.

3. A method of restoring a broken wire electrode according to claim 2, wherein the step of moving the workpiece again relative to the wire electrode from the machining starting point to the wire electrode breakage position is conducted at a speed independent of the command speed given from the machining command data.

4. A method of restoring a broken wire electrode according to claim 1, 2, or 3, further comprising the step of searching the leading data of the machining command data before moving the workpiece again relative to the wire electrode from the machining starting point to the wire electrode breakage position.

5. A method for restoring a broken wire electrode in a wire electrode-type discharge machine having a work table for supporting a workpiece in a substantially horizontal plane, a wire electrode feed system for moving the wire electrode through the substantially horizontal plane along a line substantially perpendicular thereto, and means responsive to machining command data for machining the workpiece along a predetermined path beginning at a machining starting point, said method comprising the steps of:

storing the X and Y coordinates of the machining starting point in a working memory;

detecting when the wire electrode breaks as it machines along the predetermined path;

stopping the machining operation upon detection of breakage of the wire electrode;

storing in the working memory the X and Y coordinates of the break point at which the wire electrode broke while machining along the predetermined path;

removing that portion of the broken wire electrode which lies above the workpiece;

retracting that portion of the broken wire electrode which lies below the workpiece until the broken end thereof has been retracted to a position at a first predetermined distance beneath the workpiece;

finding the difference between the X coordinates of the machining starting point and break point and finding the difference between the Y coordinates of the machining starting point and the break point to determine a direct line from the break point back to the machining starting point without regard to the predetermined path;

changing the relative positions of workpiece and the broken end of the wire electrode retracted beneath the workpiece to move the broken end substantially along the direct line determined in the previous step until the broken end lies beneath the machining starting point;

returning the wire electrode to the wire electrode feed system with the wire electrode passing through the machining starting point;

changing the relative positions of the workpiece and the wire electrode returned to the wire electrode feed system to move the wire electrode along the predetermined path through the opening machined in the workpiece before the wire electrode broke;

stopping the movement referred to in the previous step when the relative positions of the workpiece and the wire electrode conform to the break point coordinates stored in the working memory; and resuming machining along the predetermined path.

6. The method of claim 5, wherein the step of returning the wire electrode to the wire electrode feed system comprises the steps of: grasping the wire electrode at a point a second predetermined distance from the end thereof; raising the point at which the wire electrode is grasped to a position at a third predetermined distance above the workpiece; and engaging the broken end with a first wire electric feed mechanism positioned above the workpiece.

7. The method of claim 6, wherein the step of retracting that portion of the broken wire electrode which lies below the workpiece until the broken end thereof has been retracted to a position at a first predetermined distance beneath the workpiece comprises the steps of: engaging the wire electrode with a second wire electric feed mechanism positioned beneath the workpiece; activating the second wire electrode feed mechanism to begin retraction of the wire electrode; and deactivating the second wire electrode feed mechanism when the broken end is located by a wire electrode position detecting mechanism positioned at the first predetermined distance beneath the workpiece.

8. The method of claim 7, wherein the workpiece has a wire electrode insertion hole positioned at the machining starting point and wherein the step of grasping the wire electrode at a point a second predetermined distance from the broken end thereof comprises the steps of: activating the second wire electrode feed mechanism to begin raising the wire electrode; deactivating the second wire electric feed mechanism when the broken end of the wire electrode extends the second predetermined distance above the top surface of the workpiece; lowering a gripper mechanism positioned above the workpiece until the gripper mechanism abuts the top surface of the workpiece; and raising the gripper mechanism the third predetermined distance.

9. The method of claim 8, wherein the step of deactivating the second wire electrode feed mechanism when the broken end of the wire electrode extends the second predetermined distance above the top surface of the workpiece comprises the steps of: storing in the working memory a wire electrode feed number corresponding to the first distance plus the workpiece thickness plus the second distance; generating pulses corresponding to wire electrode movement as the wire electrode is raised by the second wire electrode feed mechanism; and deactivating the second wire electrode feed mechanism when the sum of the pulses equals the wire electrode feed number stored in the working memory.

10. The method of claim 5, 6, 7, 8, or 9, wherein the work table supports the workpiece for movement in the substantially horizontal plane and the wire electrode feed system moves the wire electrode through the substantially horizontal plane along a fixed line substantially perpendicular thereto, and wherein the step of changing the relative positions of the workpiece and the broken end of the wire electrode retracted beneath the workpiece and the step of changing the relative positions of the workpiece and the wire electrode returned to the wire electrode feed system are accomplished by moving the work table.

11. The method of claim 10, wherein the step of changing the relative positions of the workpiece and the broken end of the wire electrode retracted beneath the workpiece is conducted at a speed greater than the machining speed.

12. The method of claim 10, wherein the step of changing the relative positions of the workpiece and the wire electrode returned to the wire electrode feed system is conducted at a speed greater than the machining speed.

* * * * *

UNITED STATES PATENT AND TRADEMARK OFFICE
CERTIFICATE OF CORRECTION

PATENT NO. : 4,338,505
DATED : July 6, 1982
INVENTOR(S) : Katsube et al.

It is certified that error appears in the above—identified patent and that said Letters Patent is hereby corrected as shown below:

Col. 4, line 54, delete "up" (first occurrence).

Col. 7, line 13, "$RD_2$" should be --$RC_2$--;

Col. 8, line 61, "$X_p$, $X_p$" should be --$X_p$, $Y_p$--.

Col. 10, line 66, "bridging" should be --bringing--.

Signed and Sealed this

Eighteenth Day of January 1983

[SEAL]

Attest:

Attesting Officer

GERALD J. MOSSINGHOFF
Commissioner of Patents and Trademarks